United States Patent Office 2,735,860
Patented Feb. 21, 1956

2,735,860

**DEHYDROCHLORINATION OF BETA-CHLORO-
PROPYL CHLOROSILANES**

Arthur N. Pines, Snyder, and Edward R. York, Tonawanda, N. Y., assignors to Union Carbide and Carbon Corporation, a corporation of New York No Drawing. Application August 12, 1954,
Serial No. 449,520

10 Claims. (Cl. 260—448.2)

This invention relates to a process of dehydrochlorinating beta-chloropropyl chlorosilanes. More particularly the invention relates to a process of dehydrochlorinating beta-chloropropyl chlorosilanes whereby methylvinyl chlorosilanes are prepared at high production rates in pure form and in desirable yields.

It is known that monochloroethyl and dichloroethyl chlorosilanes may be dehydrochlorinated by reacting those compounds with bases for example the tertiary amines such as quinoline or picoline in an amount chemically equivalent to or in excess of the hydrogen chloride to be removed. The mechanism of this reaction may be illustrated by the following equation representing the dehydrochlorination of alpha, beta-dichloroethyl trichlorosilane

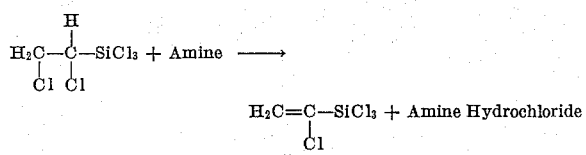

It is also known that the above processes of dehydrochlorination when applied to the dehydrochlorination of beta-chlorosilanes result in the preparation of both allyl and methylvinyl chlorosilanes in addition to considerable amounts of by-products. Heretofore extensive effort has been expended toward finding methods of dehydrochlorinating beta-chloropropyl chlorosilanes whereby methylvinyl chlorosilanes are prepared to the exclusion of allyl chlorosilanes.

We have found that beta-chloropropyl chlorosilanes may be dehydrochlorinated to produce methylvinyl chlorosilanes by a process which comprises heating such compounds in the presence of small amounts of isoquinoline or isoquinoline hydrochloride at a temperature of from about 160° C. to about 210° C., and generally under reflux conditions, to evolve hydrogen chloride and removing the evolved hydrogen chloride from the reaction zone. The amount of isoquinoline or isoquinoline hydrochloride which may be employed in the process of the present invention may vary from about 5% to about 40% by weight of beta-chloropropyl chlorosilane being dehydrochlorinated.

The process of this invention is particularly applicable to the dehydrochlorination of beta-chloropropyl trichlorosilane to obtain methylvinyl trichlorosilane. However, the process is also applicable to the dehydrochlorination of beta-chloropropyl alkyl chlorosilanes such as beta-chloropropyl methyl dichlorosilane, beta-chloropropyl ethyl dichlorosilane, beta-chloropropyl diethyl monochlorosilane and the like.

Those conditions hereinabove defined with respect to temperature and isoquinoline or isoquinoline hydrochloride concentrations under which beta-chloropropyl chlorosilanes are dehydrochlorinated are critical for the effective operation of the process. Specifically if the process is conducted at temperatures below about 160° C. dehydrochlorination does not take place. If on the other hand the process is conducted at temperatures above about 210° C. the efficiency of the reaction is seriously impaired.

With respect to the amount of isoquinoline or isoquinoline hydrochloride employed it has been found that concentrations thereof above about 40% by weight are not conducive to the effective operation of the process. For example when employing those compounds under reflux conditions sublimation of isoquinoline residues occurs and crystalline white solids are found in the distilling column. On the other hand the use of such higher concentrations in dehydrochlorinations conducted without reflux that is, by heating a mixture of the chlorosilane and isoquinoline or isoquinoline hydrochloride at temperatures between 160° C. and 210° C., creates difficulties in the separation of the methylvinyl chlorosilane from the residues of the reaction.

One method of conducting the dehydrochlorination of the instant invention comprises charging a beta-chloropropyl chlorosilane, such as beta-chloropropyl trichlorosilane together with an appropriate amount of isoquinoline or of isoquinoline hydrochloride to a flask and heating to a temperature within the range set forth above. Hydrogen chloride is evolved from the reaction mixture and is vented by suitable means to a hood. Heating is continued until the evolution of hydrogen chloride ceases at which time methylvinyl trichlorosilane may then be separated from the material remaining in the flask by fractional distillation.

The preferred embodiment of the invention comprises conducting the reaction under reflux conditions and providing for the removal of the products of the reaction, namely hydrogen chloride and a methylvinyl chlorosilane, in a single operation. This is possible as the methylvinyl chlorosilane product normally has a boiling point below the temperature at which the reaction is conducted. In the practice of this embodiment of the invention, the reaction may be conducted by heating at a temperature of from about 160° C. to about 210° C. a beta-chloropropyl chlorosilane such as beta-chloropropyl trichlorosilane with an appropriate amount of isoquinoline or isoquinoline hydrochloride in a flask connected to a distilling column packed with glass helices and provided with a still head and receiver. Shortly after reflux conditions are established the gaseous products of the reaction mixture pass to the still head where the hydrogen chloride product is vented and the gaseous chlorosilane product condensed and passed to a receiver. If desired a portion of the condensed chlorosilane product may be returned to the column to be redistilled thus insuring a purer product.

When practicing the invention in accordance with the preferred embodiment thereof, dehydrochlorination of beta chloropropyl chlorosilanes may be conducted by a continuous operation. This is accomplished by providing means for the continual addition of the starting material to the reaction mixture at a rate equal to that at which the products are collected. By so doing, small amounts of isoquinoline or of isoquinoline hydrochloride may be employed to dehydrochlorinate large quantities of a beta-chloropropyl chlorosilane.

The following example is illustrative of the invention:

*Example I*

A 250 cc. still kettle equipped with a thermometer well and a liquid entry tube extending from a feed tank was connected to a 20 x ¾-inch jacketed distilling column (packed with glass helices) equipped with a still head and receiver. The receiver for the distilling column was vented through a trap chilled with Dry Ice. Approximately 20 grams (20 cc.) of isoquinoline was placed in the kettle and about 165 grams (125 cc.) of beta-chloropropyl trichlorosilane charged thereto from the feed tank. The contents of the kettle were heated to reflux (kettle temperature approximately 168° C.) to initiate the reaction. Hydrogen chloride and methylvinyl trichlorosilane evolved from the reaction mixture with the hydrogen chloride product vented and the methylvinyl trichlorosilane collected in the receiver. Beta-chloropropyl trichlorosilane was added to the kettle from the feed tank at a rate equal to that at which methylvinyl trichlorosilane was collected in the receiver. In this manner the lequid level in the kettle remained essentially constant throughout the operation. Over a period of 13½ hours 406 grams of beta-chloropropyl trichlorosilane was treated and there was obtained 274 grams of product. Analysis of the product indicated that 116 grams of methylvinyl trichlorosilane was obtained.

What is claimed is:

1. A process of dehydrochlorinating a beta-chloropropyl chlorosilane taken from the class consisting of: (a) beta-chloropropyl chlorosilanes which contain only beta-chloropropyl groups and chlorine atoms bonded to the silicon atom thereof; and (b) beta-chloropropyl chlorosilanes which contain only beta-chloropropyl groups, alkyl groups and chlorine atoms bonded to the silicon atom thereof; which comprises heating said beta-chloropropyl chlorosilane with from about 5 per cent to about 40 per cnet by weight of said beta-chloropropyl chlorosilane of isoquinoline at a temperature of from about 160° C. to about 210° C. to evolve hydrogen chloride and removing said evolved hydrogen chloride from the reaction zone.

2. A process of dehydroclorinating a beta-chloropropyl chlorosilane taken from the class consisting of: (a) beta-chloropropyl chlorosilanes which contain only beta-chloropropyl groups and chlorine atoms bonded to the silicon atom thereof; and (b) beta-chloropropyl chlorosilanes which contain only beta-chloropropyl groups, alkyl groups and chlorine atoms bonded to the silicon atom thereof; which comprises heating said beta-chloropropyl chlorosilane with from about 5 per cent to about 40 per cent by weight of said beta-chloropropyl chlorosilane of isoquinoline hydrochloride at a temperature of from about 160° C. to about 210° C. to evolve hydrogen chloride and removing said evolved hydrogen chloride from the reaction zone.

3. A process of dehydrochlorinating a beta-chloropropyl chlorosilane taken from the class consisting of: (a) beta-chloropropyl chlorosilanes which contain only beta-chloropropyl groups and chlorine atoms bonded to the silicon atom thereof; and (b) beta-chloropropyl chlorosilanes which contain only beta-chloropropyl groups, alkyl groups and chlorine atoms bonded to the silicon atom thereof; which comprises heating said beta-chloropropyl chlorosilane with from about 5 per cent to about 40 per cent by weight of said beta-chloropropyl chlorosilane of isoquinoline at a temperature of from about 160° C. to about 210° C. under reflux conditions and removing hydrogen chloride and a methylvinyl chlorosilane from the reaction zone.

4. A process of dehydrochlorinating a beta-chloropropyl chlorosilane taken from the class consisting of: (a) beta-chloropropyl chlorosilanes which contain only beta-chloropropyl groups and chlorine atoms bonded to the silicon atom thereof; and (b) beta-chloropropyl chlorosilanes which contain only beta-chloropropyl groups, alkyl groups and chlorine atoms bonded to the silicon atom thereof; which comprises heating said beta-chloropropyl chlorosilane with from about 5 per cent to about 40 per cent by weight of said beta-chloropropyl chlorosilane of isoquinoline hydrochloride at a temperature of from about 160° C. to about 210° C. under reflux conditions and removing hydrogen chloride and a methylvinyl chlorosilane from the reaction zone.

5. A process for the continuous dehydrochlorination of a beta-chloropropyl chlorosilane taken from the class consisting of: (a) beta-chloropropyl chlorosilanes which contain only beta-chloropropyl groups and chlorine atoms bonded to the silicon atom thereof; and (b) beta-chloropropyl chlorosilanes which contain only beta-chloropropyl groups, alkyl groups and chlorine atoms bonded to the silicon atom thereof; which comprises continually feeding said beta-chloropropyl chlorosilane to a reaction vessel containing a mixture of said chlorosilane and from about 5 per cent to about 40 per cent by weight of said chlorosilane in the reaction vessel of isoquinoline, heating said mixture to a temperature of from about 160° C. to about 210° C. and continually removing hydrogen chloride and a methylvinyl chlorosilane from the reaction zone.

6. A process for the continuous dehydrochlorination of a beta-chloropropyl chlorosilane taken from the class consisting of: (a) beta-chloropropyl chlorosilanes which contain only beta-chloropropyl groups and chlorine atoms bonded to the silicon atom thereof; and (b) beta-chloropropyl chlorosilanes which contain only beta-chloropropyl groups, alkyl groups and chlorine atoms bonded to the silicon atom thereof; which comprises continually feeding said beta-chloropropyl chlorosilane to a reaction vessel containing a mixture of said chlorosilane and from about 5 per cent to about 40 per cent by weight of said chlorosilane in the reaction vessel of isoquinoline hydrochloride, heating said mixture to a temperature of from about 160° C. to about 210° C. under reflux conditions and continually removing hydrogen chloride and a methylvinyl chlorosilane from the reaction zone.

7. A process of dehydrochlorinating beta-chloropropyl trichlorosilane which comprises heating said beta-chloropropyl trichlorosilane with from about 5 per cent to about 40 per cent by weight of said chlorosilane of isoquinoline at a temperature of from about 160° C. to about 210° C. under reflux conditions and removing hydrogen chloride and methylvinyl trichlorosilane from the reaction zone.

8. A process of dehydrochlorinating beta-chloropropyl trichlorosilane which comprises heating said beta-chloropropyl trichlorosilane with from about 5 per cent to about 40 per cent by weight of said chlorosilane of isoquinoline hydrochloride at a temperature of from about 160° C. to about 210° C. under reflux conditions and removing hydrogen chloride and methylvinyl trichlorosilane from the reaction zone.

9. A process of dehydrochlorinating a beta-chloropropyl alkyl dichlorosilane which comprises heating said beta-chloropropyl alkyl dichlorosilane with from about 5 per cent to about 40 per cent by weight of said dichlorosilane of isoquinoline at a temperature of from about 160° C. to about 210° C. under reflux conditions and removing hydrogen chloride and a methylvinyl alkyl dichlorosilane from the reaction zone.

10. A process for the continuous dehydrochlorination of beta-chloropropyl trichlorosilane which comprises continually feeding said beta-chloropropyl trichlorosilane to a reaction vessel containing a mixture of said trichlorosilane and from about 5 per cent to about 40 per cent by weight of said trichlorosilane in the reaction vessel of isoquinoline, heating said mixture to a temperature of from about 160° C. to about 210° C. under reflux conditions and removing hydrogen chloride and methylvinyl trichlorosilane from the reaction zone.

References Cited in the file of this patent

UNITED STATES PATENTS 2,574,390   Hatcher   Nov. 6, 1951